3,364,059
GLASS FIBER-ELASTOMERIC SYSTEMS TREATED WITH MERCAPTAN-CONTAINING ORGANO SILANE ANCHORING AGENTS
Alfred Marzocchi, Cumberland, R.I., assignor to Owens-Corning Fiberglas Corporation, a corporation of Delaware
No Drawing. Continuation-in-part of application Ser. No. 234,852, Nov. 1, 1962. This application June 1, 1966, Ser. No. 554,363
14 Claims. (Cl. 117—72)

ABSTRACT OF THE DISCLOSURE

The method for the treatment of glass fibers to improve their bonding relationship with synthetic and organic rubbers in which the treating composition contains an anchoring agent in the form of an organo silicon compound or a Werner complex compound in which an organic group attached to the silicon atom of the organo silicon compound contains an SH group and in which the carboxylato group coordinated with the chromium atom of the Werner complex compound contains an SH group.

---

This is a continuation-in-part of my copending application Ser. No. 234,852, filed Nov. 1, 1962, and now abandoned and entitled "Glass Fiber-Elastomeric Systems and Elements."

This invention relates to elastomeric products characterized by increased strength, toughness, resiliency and wearability and relates more particularly to elastomeric systems of the type described, reinforced or otherwise modified by combination with glass fibers or flakes.

As is well recognized, glass fibers are characterized as elements having high strength, high degree of inertness, good thermal stability, low thermal conductivity and good dielectric properties amongst other desirable characteristics. Considerable effort has been expended in research and development addressed to the utilization of these desirable characteristics of glass fibers in elastomeric systems fabricated into molded and laminated products, coated fabrics and the like.

It has been found that the glass fiber components are better able to contribute their properties to products fabricated thereof when a strong and permanent bonding relationship is developed between the glass fiber surfaces and the elastomeric material with which the fibers are combined in the manufacture of such glass fiber reinforced elastomeric products.

The development of a strong and permanent bonding relationship between glass fibers and such elastomeric materials is faced by a number of problems which are peculiar to glass fibers, as distinguished from natural fibers or synthetic resinous fibers. Glass fibers, which are formed by rapid attenuation of molten streams of glass, constitute fine rod-like members which are non-porous and which have perfectly smooth surfaces. As a result, the elastomeric materials are incapable of penetration into the fibers to achieve anchorage, and they are unable to establish a strong grip onto the perfectly smooth surfaces. Thus, the physical forces of the types available to the natural cotton, wool or silk fibers are not available for anchorage onto glass fibers. Unlike the synthetic organic fibers, glass fibers are unaffected by solvents or by heat, such that the use of solvents and heat are not available for establishment of an integrated relationship between the glass fiber surfaces and elastomeric materials combined therewith in the manufacture of glass fiber reinforced plastic, laminates, and coated fabrics.

In the absence of the ability to rely on physical forces to achieve bonding, the searches have been extended into concepts for making ionic or chemical forces available for effecting the desired bonding relationship between glass fibers and elastomeric materials. Resort to chemical forces is confronted by the fact that the perfectly smooth surfaces of the glass fibers appear to be dominated by groups which impart hydrophilic characteristics whereby the glass fiber surfaces are preferentially receptive to moisture by comparison with elastomeric materials. As a result, any bonding relationship that is capable of being established between such materials is markedly diminished by the water film that immediately forms to separate the elastomeric material from the glass fiber surfaces in the presence of high humidity or moisture.

It is an object of this invention to produce and to provide a method for producing glass fiber-elastomeric systems wherein fuller utilization can be made of the desirable properties of the glass fiber component; wherein strong bonding relationship can be developed between the surfaces of the glass fibers and the elastomeric materials combined therewith in the manufacture of glass fiber-elastomeric products; wherein the bonding relationship developed between the glass fiber surfaces and the elastomeric materials is retained, even in the presence of moisture or high humidity; and wherein the desired relationship can be developed in a simple and efficient manner; and it is a related object to produce and to provide a method for producing glass fibers treated on its surface with a material for development of a strong and permanent bonding relationship when combined with elastomeric materials in the manufacture of glass fiber-elastomeric products.

As used herein, the term "glass fibers" is intended to include continuous glass fibers which are formed by rapid attenuation of molten streams of glass issuing from a plurality of openings in the underside of glass melting furnace; staple glass fibers which are formed by rapid attenuation of molten streams of glass issuing from a glass melting furnace by angular blasts of air or steam; strands, yarns and fabrics formed of such continuous or staple glass fibers; staple or continuous glass fibers coated or chopped to shorter lengths; and glass flakes in the form of extremely thin and flexible films of glass.

As used herein, the term "elastomeric materials" is meant to include natural rubber, chlorinated rubber and synthetic rubber such as neoprene, isoprene, butadiene polymers and copolymers with styrene or acrylonitrile, polyurethanes, etc.

The concepts of this invention reside in the improvement in the glass fiber-elastomeric system wherein materials become strongly bonded to the glass fiber surfaces through the medium of an anchoring agent which is capable of attachment to the glass fiber surfaces to resist separation by a moisture film which might be formed in the presence of high humidity and which embodies a grouping or groupings capable of strong attachment to the elastomeric material, either by orientation or by reaction, to become a part thereof whereby the elastomeric component becomes tied to the glass fiber surfaces to form a composite product having improved strength and many other improved physical and mechanical characteristics.

As an anchoring agent, use is made of an organo silicon compound in the form of a silane, its hydrolysis products (silanols), or its polymerization product (polysiloxanes), wherein the silane has from 1–3 highly hydrolyzable groups and an organic group attached to the silicon atom containing a thio group, as represented by the formula $$R_nSiX_{(4-n)}$$

wherein X is a highly hydrolyzable group such as chlorine, bromine, iodine or other halogen; methoxy, ethoxy, propoxy or the like short-chained alkoxy group; and amine group and the like. $n$ is a whole number of from 1 to 3 and R is a hydrogen group or an organic group such as methyl, ethyl, propyl, isopropyl, butyl, pentyl, vinyl, allyl, methallyl, chloromethyl, dichloromethyl, heptyl to octadecyl and higher and the like aliphatic group, an aryl or alkaryl group such as phenyl, tolyl, naphthyl, benzyl, mono and poly alkylphenyls, xylyl, mesityl, mono-, di- and tri-ethyl phenyls, methyl naphthyl, diethyl naphthyl, anthracyl, phenyl ethyl and the like, or an alicyclic such as cyclopentyl, cyclohexyl and the like or a heterocyclic group in which the aforementioned organic groups may be substituted or unsubstituted, saturated or unsaturated, and in which at least one R group comprises R' SH in which R' is an aliphatic, aryl, alkaryl, alicyclic or heterocyclic group corresponding to the organic group identified as R above and in which the thio group preferably on a short-chained group having less than eight carbon atoms in aliphatic arrangement.

It is believed that the silicon oxide groups or other groupings on the surfaces of the glass fibers and the silicon atom of the organo silicon compound or silicon oxide linkages of the polysiloxane orient one with the other on the glass fiber surfaces to achieve a strong and permanent bonding relationship between the organo silicon compound and the glass fibers. Whatever the reason, it is found that the organo silicon compound becomes bonded to the glass fiber surfaces in a manner to modify the characteristics thereof whereby the surfaces retain the organo silicon compound strongly bonded thereto, even in the presence of high humidity.

At the same time, the thio groups which form a part of the organo silicon compound are effective as agents for vulcanization or cure of the elastomeric components thereby to tie into the elastomeric material or otherwise provide a highly receptive surface for the elastomeric material whereby the organo silicon compound functions as an anchoring agent to secure the elastomeric material to the glass fiber surfaces.

An organo silicon suitable for use in the practice of this invention can be prepared in various ways in which the following are given by way of illustration, but not by way of limitation:

*Example 1*

Reaction of an unsaturated silane with hydrogen sulfide in accordance with Equation I:

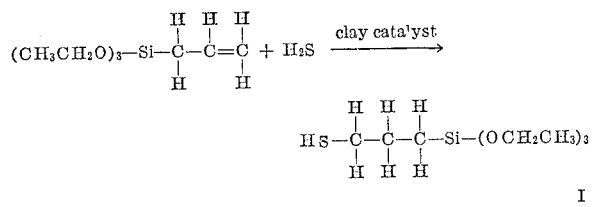

I

The hydrogen sulfide is bubbled through the vinyl triethoxy at a temperature of about 100° C. and under a pressure of 5 atmospheres. The materials react in an equal molecular ratio but it is desirable to bubble through an excess of as much as 50% of the hydrogen sulfide to provide for a fuller completion of the reaction.

*Example 2*

A similar reaction can be carried out with alkyl trichloro silane and hydrogen sulfide to form the corresponding thio alkyl silane as represented by the following equation:

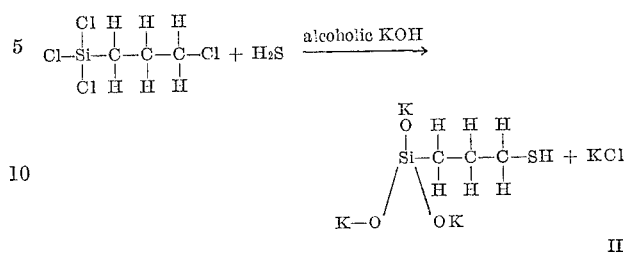

II

In the above reaction, the hydrogen sulfide is bubbled through the chloropropyl silicon trichloride at a temperature of about 125° F. and about 100 p.s.i. with as much as 50% excess hydrogen sulfide being introduced over and above the theoretical amount. The potassium hydroxide functions as a catalyst.

A similar reaction can be carried out with chloroethyl, chlorobutyl, bromoethyl, etc., as the raw material, to produce the corresponding thioethyl, thiobutyl silane.

*Example 3*

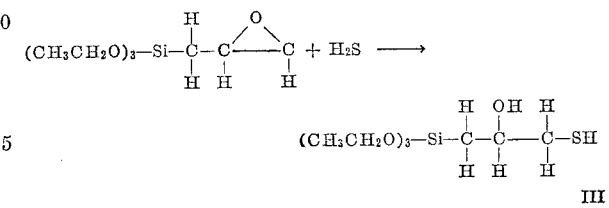

III

The epoxy triethoxy silane is reacted with hydrogen sulfide at elevated pressure to form the corresponding thiopropyl thioethoxy silane having a free hydroxy group in the organic group attached to the silicon atom.

A new and novel compound capable of use as an anchoring agent in accordance with the described features of this invention, but which can additionally tie into the rubber or elastomeric component as a plasticizer and also as a toughener is a further concept of this invention, resides in the use of an organo silicon compound of the type described in Example 3, but in which less than all of the epoxy groups are converted by the hydrogen sulfide to the corresponding thio compound or in which the organo silicon compound contains more than one organic epoxy group attached to the silicon atom for reaction of only a part thereof to the corresponding thio group, while the others of the epoxy groups remain for reaction with the rubber during cure. The following represents the preparation of compounds of the type described:

*Example 4*

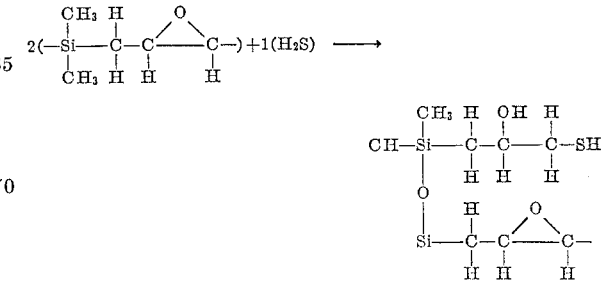

IV

Example 5

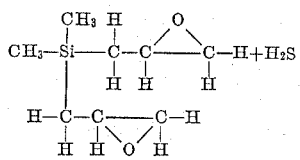

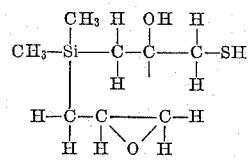

When the compound of Example 5 reacts as a plasticizer and in the cure of the rubber, the epoxy group is believed to tie into the rubber as follows:

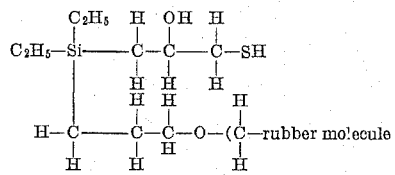

The following will illustrate the practice of this invention:

Example 6

In the conventional method for the production of continuous glass fibers, molten streams of glass issue gravitationally from the bottom side of a glass melting furnace. The molten streams of glass are rapidly attenuated into fine filaments by winding the filaments, after they have been gathered together to form a strand, about a rapidly rotating drum.

The separated filaments are usually coated as they are gathered together into the single bundle or strand. For this purpose, use is made of an applicator in the form of a roller coater over which the fibers are passed or in the form of a wiping pad by which the fibers are gathered together with the roller or pad wet with a fluid treating composition containing the thioalkyl or aryl or alkaryl silane, or its hydrolysis product, or its polymerization product, in accordance with the practice of this invention. Thus the individual filaments of glass are wet with a composition containing the described anchoring agent to coat the fibers therewith.

The compositions applied to the glass fibers are formulated to contain the compound referred to herein as the thio organo silicon compound. The compound may be applied alone in solution in a suitable volatilizable carrier, as illustrated in Examples 7 to 11, but it is preferred to embody the anchoring agent as an essential component in conventional size compositions of the type illustrated by the Examples 12 and 13. When employed in a treating composition formulated to contain the anchoring agent alone, as in Examples 7 to 11, or in combination with a suitable film-forming material and lubricant, as in Examples 12 and 13, it is desirable to make use of a composition containing the anchoring agent in an amount within the range of 0.1% to 5.0% by weight, and preferably in an amount within the range of 0.5 to 2.0% by weight. The following examples are given by way of illustration of suitable treating compositions which may be employed in the practice of this invention.

Example 7

| | Percent by weight |
|---|---|
| Thiopropyl triethoxy silane | 0.1 to 5.0 |
| Remainder is water. | |

Example 8

| | |
|---|---|
| Thiomethyl trichloro silane | 0.5 to 2.0 |
| Glycerin | 0.3 to 0.6 |
| Remainder is water. | |

Example 9

| | |
|---|---|
| Thiotoluyl diethoxy silane | 1.0 |
| Remainder is water. | |

Example 10

2% by weight of the compound illustrated in Example 4
2% by weight ethylene glycol
Remainder is water.

Example 11

2% to 5% by weight of thio compound illustrated in Example 5
Remainder is water.

Example 12

| | Percent by weight |
|---|---|
| Dextrinized starch | 8.0 |
| Hydrogenated soya oil | 1.8 |
| Lauryl amine acetate (wetting agent) | 0.4 |
| Non-ionic emulsifying agent | 0.2 |
| Thiopropyl trimethoxy silane | 1.5 |
| Remainder is water. | |

Example 13

| | Parts by weight |
|---|---|
| Polyester resin | 3.2 |
| Stearyl amine chloride | 0.1 |
| Tetraethylene pentamine fatty acid solubilized with acetic acid | 0.1 |
| Polyvinyl alcohol | 0.1 |
| Polyvinyl pyrrolidone | 3.0 |
| Gamma thiopropyl triethoxy silane | 0.4 |
| Acetic acid | 0.1 |
| Water | 93.2 |

In the foregoing Examples 7 to 13, the thiosilane can be replaced by other thio silanes such as thioethyl dichloro silane, thiobutyl triethoxy silane, thiophenyl diethoxy silane, etc.

When the treated glass fibers are subsequently to be processed into yarns, cords, and fabrics for subsequent combination with the elastomeric material, it is preferred to make use of a composition in which the anchoring agent is embodied as a component in a glass fiber forming size, as represented by Examples 12 and 13, thereby to provide the glass fibers with a coating that enhances the processing as well as the performance characteristics to enable the glass fibers to be formed into yarns, cords, and fabrics, while also permitting the glass fibers to be employed beneficially as a reinforcement in combination with elastomeric materials, without the necessity of removing the protective size composition for replacement with the anchoring agent. If the fibers are to be used directly in combination with an elastomeric material, then compositions of the type illustrated by Examples 7 to 11 are preferred. When use is made of glass fibers treated with the thio silane alone, as by the compositions of Examples 7 to 11, it is desirable first to process the glass fibers to the condition desired for use in the combination with the elastomeric materials and then remove the size originally applied, as by a wash or by heat cleaning at a temperature of 900° to 1150° F. in an oxidizing atmosphere. The cleaned glass fibers or fabric formed thereof can then be treated with the composition of Examples 7 to 11 by passing the fibers or fabric through a bath of the composition, followed by drying.

Instead of wiping the treating compound onto the glass fibers, the treating composition can be applied by other conventional coating means and methods, such as by spray-coating, roller-coating, dip-coating, die-coating, flow-coating, and the like. It is preferred to apply the anchoring agent directly onto bare glass fibers, as in the described forming operation, or after the original size has been removed, since the anchoring agent is in a position more effectively to utilize its interbonding characteristics.

Treatment of glass fibers in forming, with composition 13 results in a treated glass fiber characterized by low ignition loss and in which the glass filaments forming the strand are capable of easy separation to enable fuller penetration of the elastomeric material into the strand of glass fibers to impregnate the strand and to coat the fibers with the elastomeric material.

Glass fibers coated with the compositions of Examples 7 to 13 and in accordance with the treatment of Example 6 can be dried at elevated temperature, but it is the usual practice to permit the sized or coated glass fibers to air-dry. The dried strands of glass fibers can be used as such, or cut or chopped to shorter lengths for combinations with the elastomeric materials. Instead, the fibers can be processed into yarns, twisted into cords, or woven into fabrics for subsequent combination with the elastomeric material in the manufacture of elastomeric coated glass-fiber fabrics or glass-fiber-reinforced molded or laminated elastomeric products.

*Example 14*

Yarns of glass fibers embodying various compositions as a coating were wound about a mandrel with a layer of unvulcanized polyurethane on opposite sides of the treated glass-fiber yarns. Thereafter, the assembly was vulcanized by heating to a temperature of 350° F. to produce a laminate of vulcanized polyurethane with cords of treated glass fibers sandwiched in between.

In one instance the glass fibers were previously treated with a conventional binder of the type corresponding to Example 11 with the thio silane anchoring agent omitted. In another instance, the fibers were treated with the size composition of Example 11.

To test adhesion between the plies of polyurethane and the glass-fiber cords sandwiched in between, one ply and the glass-fiber cords were anchored between one set of jaws while the other ply was gripped between another set of jaws, and force required to effect separation of the plies was measured. The laminate fabricated of glass fibers sized with the composition of Example 11 required considerable more force for separation than the other.

The concepts described can also be achieved by an unrelated and non-equivalent system wherein the thio group is embodied within the carboxylato group coordinated with the trivalent nuclear chromium atom in a Werner complex compound. In a system of the type described, the chrome complex anchors to the glass-fiber surfaces through the complex chromium atom, while the thio group remains available in the coordinated carboxylato group to provide a receptive base for anchorage of the elastomeric material and to enter into the vulcanization or cure of the elastomer, as described with reference to the thio organo silicon compound. In the use of a Werner complex compound, it is preferred to make use of a carboxylato group having less than 8 carbon atoms, although chain groups can be employed as long as the thio group embodied therein is available for reaction. For other organic carboxylato groups which may be coordinated with the chromium atom in the Werner complex compound, reference may be made to the issued United States Patent Nos. 2,273,040 and 2,356,161 of Iller and United States Patent No. 2,544,666 of Goegel, et al. except that a thio group is substituted onto the organic carboxylato group of the described Werner complex compounds. The following are examples of coating compositions formulated of the thio Werner complex compounds and which may be applied to the glass fibers in accordance with the teachings of the Examples 6 to 13.

*Example 15*

0.1% to 5.0% by weight thioaceto chrome complex
Remainder is alcohol

*Example 16*

0.5% to 2.0% by weight thiomethacrylato chrome complex
Remainder is water

*Example 17*

1.0% by weight thiobenzoato chrome complex
Remainder is water and alcohol

The following will represent the further practice of this invention wherein an anchoring agent of the type illustrated in Examples 4 or 5 is embodied as a component in the elastomeric material or both on the glass fiber surfaces and the elastomeric material with which the glass fibers are combined in the manufacture of glass fiber reinforced plastics, laminates, and coated fabrics.

*Example 18*

1% to 5.0% by weight of the compound illustrated in Example 4
Remainder is rubber, with additional sulphur sufficient for cure, with or without additional filler The glass fibers, with or without a coating of Examples 9 and 10, are combined with the elastomeric material of Example 16 and advanced to cure at a temperature of about 350° F. under positive pressure. The elastomeric material in the foregoing example may comprise natural rubber, neoprene, isoprene, or butadiene polymers or copolymers.

It will be apparent from the foregoing that I have provided a new and improved method, means, and materials for the production of glass fiber-elastomeric systems whereby fuller utilization is made of the desirable properties of the glass fibers in the products formed of the combination of glass fibers with elastomeric materials. It is believed that novelty resides not only in the treated glass fibers and the glass fiber-elastomeric systems formed thereof, but also in the thio silicon compounds and Werner complex compounds.

The thioalkyl and the thioalkaryl compounds employed in the practice of this invention can also be prepared (1) by formation of a Grignard reagent by reaction of gamma chloropropyl triethoxysilane with magnesium in the presence of ethyl ether, followed by the reaction of the resulting compound with sulphur or (2) by reaction of gamma chlorotriethoxy silane directly with thiourea in the presence of sodium carbonate.

It will be understood that changes may be made in the details of the formulation, methods of application, and construction, without departing from the spirit of the invention, especially as defined in the following claims.

I claim:

1. Glass fibers and a coating on the glass fiber surfaces to improve their bonding relationship with synthetic and natural elastomeric materials in which the coating contains an anchoring agent in the form of an organo silicon compound having an SH group on an organic group attached to the silicon atom and which is capable of chemical bonding with the elastomeric material.

2. A product as claimed in claim 1 in which the organo silicon anchoring agent is selected from the group consisting of a silane, its hydrolysis product, and its polymerization product in which the silane is represented by the formula $R_nSiX_{(4-n)}$ in which $n$ is a whole number from 1 to 3, X is a highly hydrolizable group and R is an organic group in which at least one of the organic R groups contains an SH group.

3. A product as claimed in claim 1 in which the synthetic and natural elastomeric material is a curable rubber.

4. A product as claimed in claim 1 in which the coating is present on the glass fiber surfaces in at least a mono molecular layer.

5. A product as claimed in claim 1 in which the anchoring agent is also formed with an epoxy group as a part of an organic R group attached to the silicon atom.

6. A product as claimed in claim 1 in which the anchoring agent is formulated as a component in combination with the synthetic and natural elastomeric material.

7. In the method of producing a glass fiber-elastomeric product wherein the elastomer is strongly bonded to the glass fiber surfaces, the steps of coating the glass fibers with a treating composition containing an anchoring agent in the form of an organo silicon compound having an SH group on an organic group attached to the silicon atom, drying the coated fibers and combining the coated fiber with an elastomeric material and then advancing the elastomeric material to a cured state.

8. The method as claimed in claim 7 in which the organo silicon compound is selected from the group consisting of a silane, its hydrolysis product, and its polymerization product in which the silane is represented by the formula $R_nSiX_{(4-n)}$ in which $n$ is a whole number from 1 to 3, X is a highly hydrolizable group and R is an organic group in which at least one of the organic R groups contains an SH group.

9. The method as claimed in claim 7 in which the treating composition contains the anchoring agent in an amount within the range of 0.1 to 5.0 percent by weight.

10. The method as claimed in claim 7 in which the treating composition contains the anchoring agent in an amount within the range of 0.5 to 2.0 percent by weight.

11. The method as claimed in claim 7 in which the anchoring agent is also formed with an epoxy group on an organic group attached to the silicon atom.

12. The method as claimed in claim 7 which includes the step of incorporating the anchoring agent into the uncured elastomeric material prior to combination between the elastomeric material and the treated glass fibers.

13. The method as claimed in claim 12 in which the anchoring agent is incorporated into the elastomeric material in an amount within the range between 1 to 5 percent by weight of the elastomeric material.

14. The method as claimed in claim 7 in which the treating material is applied onto the glass fiber surfaces in at least a mono molecular layer.

References Cited

UNITED STATES PATENTS

| | | | |
|---|---|---|---|
| 2,841,566 | 7/1958 | Te Grotenhuis | 117—126 X |
| 3,186,965 | 6/1965 | Plueddemann | 260—448.2 X |
| 3,278,484 | 10/1966 | Tesoro | 260—448.2 X |

ALFRED L. LEAVITT, *Primary Examiner.*

H. COHEN, *Assistant Examiner.*

Notice of Adverse Decisions in Interferences

In Interference No. 97,469 involving Patent No. 3,364,059, A. Marzocchi, GLASS FIBER-ELASTOMERIC SYSTEMS TREATED WITH MERCAPTAN-CONTAINING ORGANO SILANE ANCHORING AGENTS, final judgment adverse to the patentee was rendered May 31, 1973, as to claims 1, 2, 3, 4, 6, 7, 8, 9, 10, 12 and 14.

[*Official Gazette October 23, 1973.*]